(12) United States Patent
Brickman

(10) Patent No.: US 9,358,761 B2
(45) Date of Patent: Jun. 7, 2016

(54) MULTILAYER PAPER SYSTEM

(71) Applicant: Max Brickman, Milwaukee, WI (US)

(72) Inventor: Max Brickman, Milwaukee, WI (US)

( * ) Notice: Subject to any disclaimer, the term of this patent is extended or adjusted under 35 U.S.C. 154(b) by 46 days.

(21) Appl. No.: 14/341,353

(22) Filed: Jul. 25, 2014

(65) Prior Publication Data
US 2015/0246513 A1    Sep. 3, 2015

Related U.S. Application Data

(60) Provisional application No. 61/946,864, filed on Mar. 2, 2014.

(51) Int. Cl.
| | |
|---|---|
| *B32B 29/00* | (2006.01) |
| *G07C 13/00* | (2006.01) |
| *B32B 7/06* | (2006.01) |
| *G06K 17/00* | (2006.01) |

(52) U.S. Cl.
CPC .............. *B32B 29/005* (2013.01); *B32B 7/06* (2013.01); *G07C 13/00* (2013.01); *B32B 2250/02* (2013.01); *B32B 2250/26* (2013.01); *B32B 2307/40* (2013.01); *B32B 2307/402* (2013.01); *B32B 2307/41* (2013.01); *B32B 2307/412* (2013.01); *G06K 2017/0064* (2013.01); *Y10T 428/24934* (2015.01); *Y10T 428/31993* (2015.04)

(58) Field of Classification Search
CPC ........... G07C 13/00; G06K 2017/0064; B32B 29/00; B32B 29/005; B32B 2250/02; B32B 2250/26; B32B 2307/40; B32B 2307/402
USPC .......................... 283/5, 72, 94; 503/201, 215
See application file for complete search history.

(56) References Cited

U.S. PATENT DOCUMENTS 7,516,891 B2 * 4/2009 Chaum .................. G07C 13/00
                                                                235/386

* cited by examiner

*Primary Examiner* — Bruce H Hess
(74) *Attorney, Agent, or Firm* — Boyle Fredrickson, S.C.

(57) ABSTRACT

A multilayer paper system that allows a user to write or fill in forms while non-users are unable to see what is written through the use of a first layer privacy screen with embedded micro-louvers, a second color change layer with microencapsulated dye, and a stylus type pen that causes color change to occur on the second layer while reducing the ability for those next to or around the person to discern what is written on the sheet.

4 Claims, 3 Drawing Sheets

MULTILAYER PAPER SYSTEM

CROSS REFERENCE TO RELATED APPLICATIONS

This application is related to and claims priority to U.S. Provisional Patent No. 61/946,864 filed on Mar. 2, 2014.

TECHNICAL FIELD

The present novel technology relates generally to the field of scannable response forms, and, more particularly, to a multilayer paper system that allows a user to write or fill in forms while non-users are unable to see what is written.

BACKGROUND

Scannable forms enable rapid monitoring of items, and permits more frequent record keeping or testing than might otherwise be achieved if an operator had to check the forms manually. One manner in which scannable forms are used is to score scholastic test results. These forms are ideal for test taking because the preprinted forms save time for an operator grading student response forms, and are available at a relatively low cost. However, while in use, these forms do not provide any privacy or protection from the view of others; thus, academic integrity is a concern.

Although it is known to employ various methods to reduce or diminish academic dishonesty on exams (i.e., monitoring exams with proctors, prohibiting talking or any form of communication, using various versions of the test with the questions scrambled), a cost effective manner of ensuring academic integrity during test taking that utilizes scannable forms has not been successfully employed in a manner that hides the test takers responses from anyone other than those within a predetermined visibility range, while being durable for reuse.

There is a need for an improved system that may be utilized with scannable forms that reduces the ability for those next to or around the test taker from discerning what is written on the form. The present novel technology addresses this need.

DESCRIPTION

Figure 1:
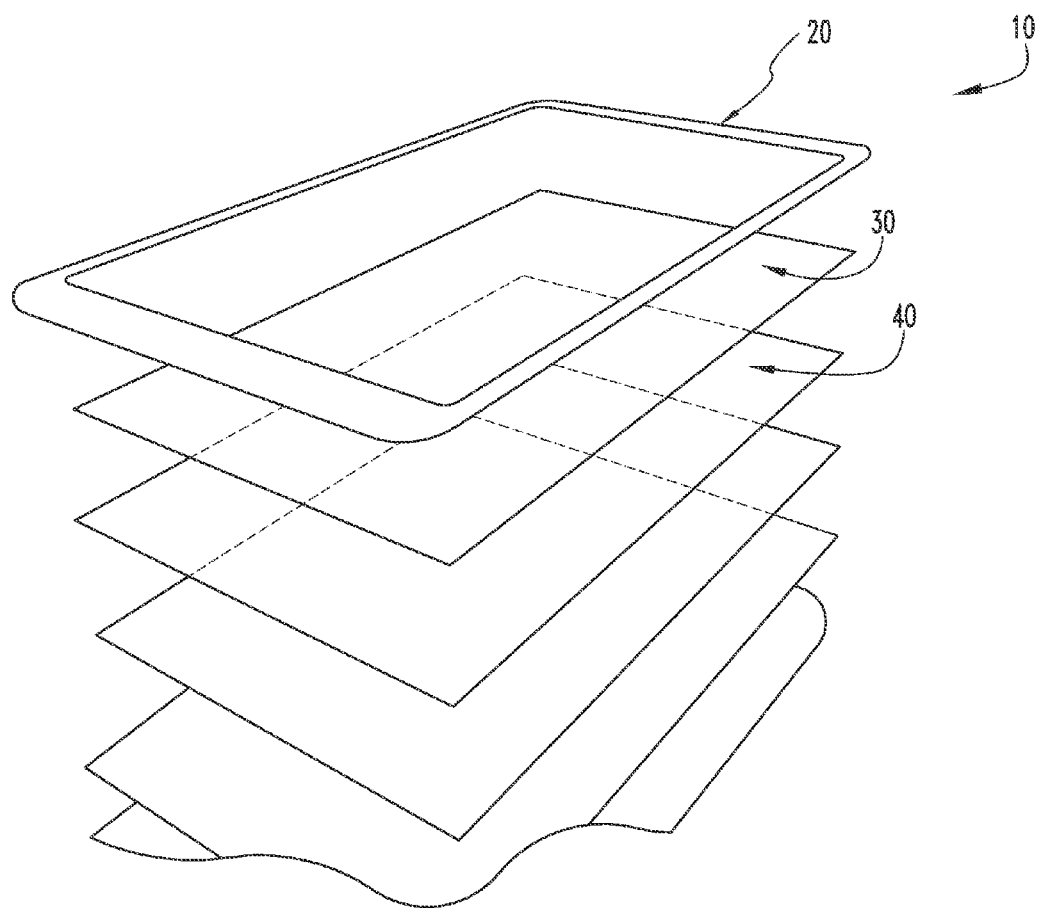
FIG. 1 is a side exploded view of a multilayer paper system according to a first embodiment of the present novel technology.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Figure 2:
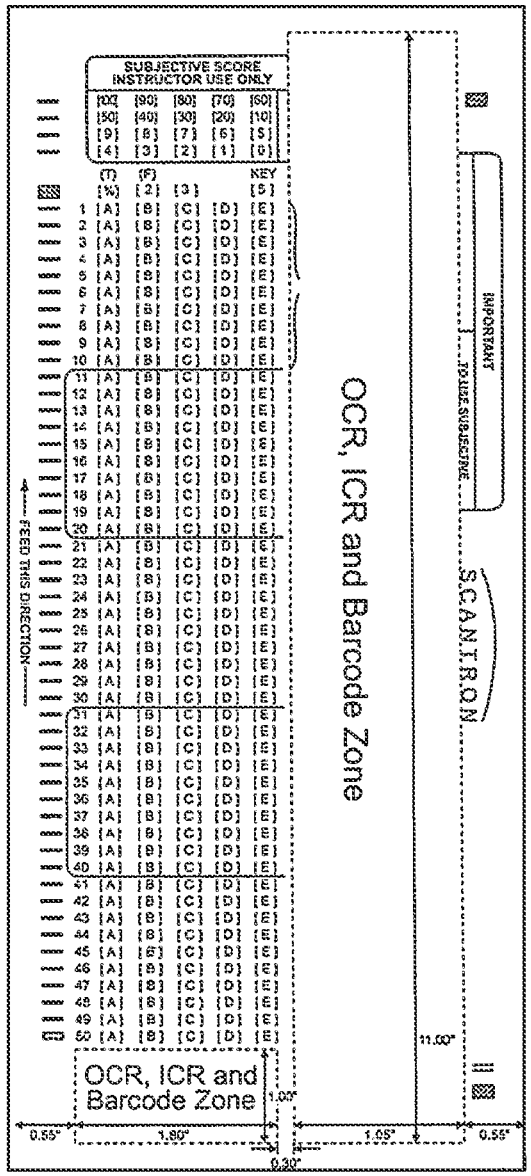
FIG. 2 is a top plan view of the embodiment of FIG. 1 illustrating a scannable form.

FIGS. 1-2 represent a first embodiment of the present novel technology, a paper system 10 that generally contains multiple layers (or single layer with multiple functionality) for allowing a user to write or fill in forms 40 while non-users are unable to see what is written. The paper system 10 typically includes a first thin privacy screen layer 20 and a second color change layer 30, generally bound or temporarily connected while in use. The first thin privacy screen layer 20 typically contains embedded micro-louvers 25, or the like, that allow transparency from an incident viewing angle typically around 90 degrees, although other viewing angles may allow transparency, but provide an opaque surface to more oblique viewing angles. The screen layer 20 acts much like Venetian blinds or some computer monitor screens, but is much thinner. The second layer 30 includes microencapsulated color changing agent 30 (which may be a dye, solution, single or binary system, heat activated, or the like). Sufficient pressure on the second layer 30 selectively ruptures microencapsulated ink, dye or the like that results in a readable image on the color change layer 30 and, typically, on the form 40 located below and in contact with the color change layer 30. In some embodiments, the color change layer 30 is unitary with the form 40.

In use, a user utilizes a stylus type pen to press or write on the privacy filter 20. The resulting pressure forces a focused point of the privacy screen 20 into the layers below 30 until the microcapsules rupture and color change occurs in a focused area where the user applied pressure. The pressure change will occur with force similar to that at the tip of a pen when writing normally. Therefore, the color change sheets will not react with lighter pressure during production, printing, from nip-pressure when holding the paper, or from scanning while writing, the user's viewing point will be above the paper 10 within an angle range of about 20% which will allow him or her to see the color change instantly as if writing. However, the privacy screen's micro-louvers will reduce the ability for those next to or around the person to discern what is written on the sheet. In one example, the visibility (transmittance) for a viewer within the predetermined range is between 50% and 100% whereas the visibility for a viewer outside the predetermined range is between 0% and 50%.

All layers of the product 10 are typically bound or temporarily connected while in use, but can be separated easily after use. The color change sheet 30 may then be seen without the use of the privacy filter 20, or other layers. The form sheet 40 may then be fed into a scanner, copier or other machine, to perform OMR (Optical Mark Recognition) or copying without causing the sheet to change color more. In some embodiments, the color change layer 30 includes inks or dyes that have infrared absorbing and/or reflecting components so as to be more compatible with OMR systems. Text or other indicia may be printed on one or both of the privacy filter later and the color change layer. Examples of such printing may include fill in answer bubbles, boxes, ovals, and the like as well as lines or spaces for filing out identifying information such as name, student number, date, and the like. Forms created for uses other than testing may include different printing as desired.

Figure 3:
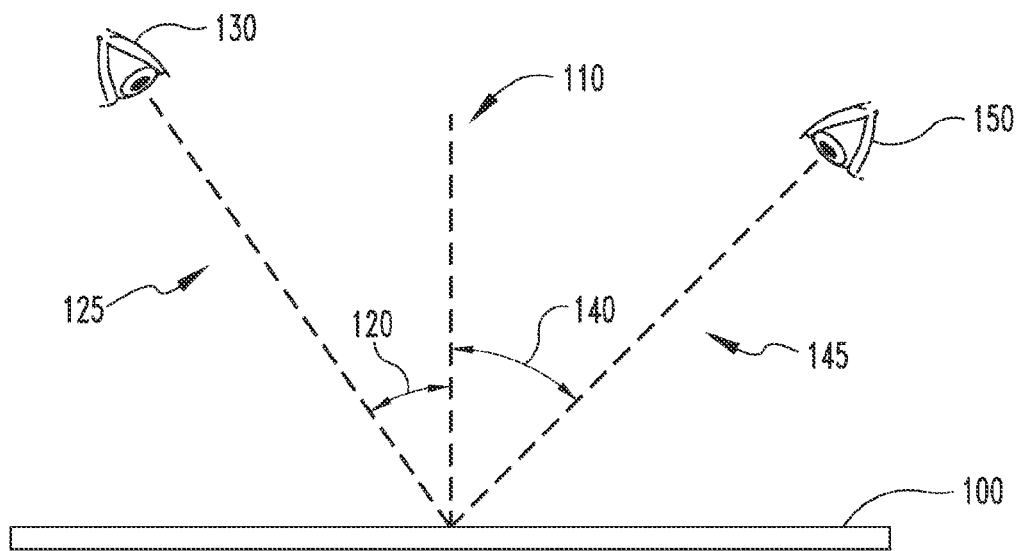
FIG. 3 is a side view of another embodiment of the novel technology.

Another embodiment of the novel technology is shown in FIG. 3. In this particular embodiment, a multilayer scannable form 100 is being viewed by two different viewers 130, 150 from two different viewing angles 120, 140. If an imaginary line 110 is drawn normal to the surface of the form 100 (i.e., at a 90 degree angle), then line 125 represents the viewing angle of viewer 130 and line 145 represents the viewing angle of viewer 150. In this particular example, angle 120 is about 20 degrees making the viewing line 125 of viewer 130 about 70 degrees and angle 140 is about 45 degrees making the viewing line 145 of viewer 150 about 45 degrees. Viewer 130 would be able to view form 100 and anything written thereon normally because viewing angle 120 is within the 20% viewing angle range of the form 100. Viewer 150, however, would have an obscured or diminished view of anything written on form 100 as the viewing angle 140 falls outside of the viewing angle range of the form 100. In other examples forms may have a wider or narrower viewing range as desired.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A method of administering a test, comprising:
    a) providing a scannable response form to a test taker, said form comprising a first layer having embedded microlouvers and a second layer having microencapsulated color changing agents;
    b) providing a stylus to said test taker;
    c) marking answers on said response form using said stylus, wherein pressure applied by said stylus causes said microencapsulated color changing agents to rupture;
    d) collecting said response form at the conclusion of said test; and
    e) grading said response form using an OMR device.

2. The method of claim 1, wherein prior to said grading step said first layer and said second layer of said response form are separated from one another.

3. The method of claim 2 wherein said grading step comprises scanning said second layer using an OMR device.

4. The method of claim 1, wherein said microencapsulated color changing agent is a dye.

\* \* \* \* \*